United States Patent
Hurtta

(10) Patent No.: US 9,826,465 B2
(45) Date of Patent: Nov. 21, 2017

(54) ADDING SERVICE SET IDENTIFIER OR ACCESS POINT NAME TO WLAN TO CELLULAR SIGNALLING MESSAGES

(75) Inventor: Tuija Helena Hurtta, Espoo (FI)

(73) Assignee: NOKIA SOLUTIONS AND NETWORKS OY, Espoo (FI)

(*) Notice: Subject to any disclaimer, the term of this patent is extended or adjusted under 35 U.S.C. 154(b) by 0 days.

(21) Appl. No.: 14/412,766

(22) PCT Filed: Jul. 6, 2012

(86) PCT No.: PCT/EP2012/063281
§ 371 (c)(1),
(2), (4) Date: Feb. 24, 2015

(87) PCT Pub. No.: WO2014/005652
PCT Pub. Date: Jan. 9, 2014

(65) Prior Publication Data
US 2015/0195771 A1    Jul. 9, 2015

(51) Int. Cl.
*H04W 8/10* (2009.01)
*H04W 48/08* (2009.01)
(Continued)

(52) U.S. Cl.
CPC ............ *H04W 48/14* (2013.01); *H04W 8/10* (2013.01); *H04W 48/08* (2013.01); *H04W 64/00* (2013.01);
(Continued)

(58) Field of Classification Search
CPC ..... H04W 8/12; H04W 76/02; H04W 76/021; H04W 76/022; H04W 48/17;
(Continued)

(56) References Cited

U.S. PATENT DOCUMENTS 5,933,114 A * 8/1999 Eizenhofer .......... G07B 15/063
340/928
6,035,198 A * 3/2000 Wiehe ..................... H04W 8/12
455/408

(Continued)

OTHER PUBLICATIONS

3GPP, TS 23.402, 3rd Generation Partnership Project Technical Specification Group Services and System Aspects; Architecture enhancements for non-3GPP accesses (Release 11), Jun. 2012, Version 11.3.0, §16.1.*

(Continued)

*Primary Examiner* — Michael Thier
*Assistant Examiner* — Eric Nowlin
(74) *Attorney, Agent, or Firm* — Squire Patton Boggs (US) LLP

(57) ABSTRACT

The application relates to the integration of WLAN access networks into cellular communication networks, often referred to as "Non-3GPP Access" in 3GPP standardization, in particular TS 23.402. Location information, such as SSID, WLAN access point name, WLAN access point identifier, WLAN access point MAC address is currently not available for GTP based S2a nor GTP based S2b, and neither for the Gn interface nor for PMIPv6 based S2a. However, Location information is needed in the PGW/GGSN for multiple purposes, e.g. for policy enforcement, charging and lawful interception. This problem is solved by the application in that the missing information is included in a protocol message of the cellular communications system, in particular a GTPv1, GTPv2 or PMIPv6 signalling message, and communicated (S2) to the cellular communications system. Furthermore, an event trigger, similar to event triggers on the Gx interface which may be set by the PCRF, may be set by the PCRF/OCS in the WLAN (S4, S5) to request up-to-date location information (S6, S7, S8).

21 Claims, 3 Drawing Sheets

(51) Int. Cl.
   *H04W 48/14*   (2009.01)
   *H04W 64/00*   (2009.01)
   *H04W 84/04*   (2009.01)
   *H04W 84/12*   (2009.01)
   *H04W 88/06*   (2009.01)
   *H04W 92/02*   (2009.01)

(52) U.S. Cl.
   CPC .......... *H04W 84/042* (2013.01); *H04W 84/12* (2013.01); *H04W 88/06* (2013.01); *H04W 92/02* (2013.01)

(58) Field of Classification Search
   CPC ..... H04W 48/14; H04W 64/00; H04W 92/02; H04L 12/4633; H04L 12/66
   See application file for complete search history.

(56) References Cited

U.S. PATENT DOCUMENTS

| | | | |
|---|---|---|---|
| 7,366,509 B2 | 4/2008 | Akgun et al. | |
| 7,532,894 B1* | 5/2009 | Muhonen | H04W 8/10 455/404.2 |
| 8,270,978 B1* | 9/2012 | Faccin | H04W 36/0016 370/331 |
| 8,644,276 B2* | 2/2014 | McCann | H04W 48/14 370/338 |
| 8,665,842 B2* | 3/2014 | McCann | H04W 48/14 370/338 |
| 8,744,479 B2* | 6/2014 | Kreher | G01S 5/0252 455/456.1 |
| 8,831,633 B2* | 9/2014 | Moshfeghi | G01S 19/48 455/456.1 |
| 8,838,135 B2* | 9/2014 | Moshfeghi | G01S 19/48 455/456.1 |
| 8,909,239 B2* | 12/2014 | Edge | H04W 4/06 342/357.49 |
| 8,918,075 B2* | 12/2014 | Maier | H04W 4/22 370/352 |
| 8,958,404 B2* | 2/2015 | Malkamaki | H04W 48/14 370/331 |
| 8,965,326 B2* | 2/2015 | Michaelis | H04W 76/007 455/404.1 |
| 9,002,377 B2* | 4/2015 | Ayalur | H04W 64/00 342/357.2 |
| 9,060,281 B2* | 6/2015 | Issakov | H04W 24/00 |
| 9,188,659 B2* | 11/2015 | Siomina | G01S 19/49 |
| 9,232,041 B2 | 1/2016 | Jessup | G06F 17/3087 |
| 9,241,353 B2 | 1/2016 | Do | H04W 76/02 |
| 9,332,394 B2* | 5/2016 | Moshfeghi | G01S 19/48 |
| 9,338,606 B2* | 5/2016 | Moshfeghi | G01S 19/48 |
| 9,648,479 B2* | 5/2017 | Michaelis | H04W 4/22 |
| 2002/0016173 A1* | 2/2002 | Hunzinger | H04W 64/00 455/456.5 |
| 2002/0090957 A1* | 7/2002 | Harris | H04W 4/02 455/456.2 |
| 2003/0040313 A1* | 2/2003 | Hogan | H04W 60/00 455/435.1 |
| 2005/0185615 A1* | 8/2005 | Zegelin | H04W 48/20 370/331 |
| 2010/0056178 A1* | 3/2010 | Kreher | G01S 5/0252 455/456.1 |
| 2010/0136947 A1* | 6/2010 | Yoo | H04W 4/22 455/404.2 |
| 2010/0285816 A1* | 11/2010 | Vos | H04W 60/04 455/456.1 |
| 2010/0322106 A1* | 12/2010 | Qiang | H04W 76/021 370/254 |
| 2010/0323700 A1* | 12/2010 | Bachmann | H04W 36/0066 455/436 |
| 2011/0188411 A1* | 8/2011 | Faccin | H04W 76/02 370/259 |
| 2011/0280227 A1* | 11/2011 | McCann | H04W 48/14 370/338 |
| 2011/0280228 A1* | 11/2011 | McCann | H04W 48/14 370/338 |
| 2012/0131117 A1* | 5/2012 | Leshchiner | H03M 7/30 709/206 |
| 2012/0164969 A1* | 6/2012 | Bhatia | H04W 64/00 455/404.2 |
| 2012/0246074 A1* | 9/2012 | Annamalai | G01S 1/68 705/44 |
| 2012/0295635 A1* | 11/2012 | Yokota | G01S 5/0063 455/456.1 |
| 2012/0309430 A1* | 12/2012 | Ayalur | G01S 5/0252 455/456.6 |
| 2012/0329476 A1* | 12/2012 | Tenny | H04W 64/00 455/456.1 |
| 2013/0029685 A1* | 1/2013 | Moshfeghi | G01S 19/48 455/456.1 |
| 2013/0029686 A1* | 1/2013 | Moshfeghi | G01S 19/48 455/456.1 |
| 2013/0225185 A1* | 8/2013 | Edge | H04W 4/06 455/450 |
| 2013/0310073 A1* | 11/2013 | Scozzaro | G01S 5/0063 455/456.1 |
| 2013/0331122 A1* | 12/2013 | Ayalur | H04W 64/00 455/456.1 |
| 2014/0003357 A1* | 1/2014 | Ejzak | H04W 76/021 370/329 |
| 2014/0080503 A1* | 3/2014 | Issakov | H04W 24/00 455/456.1 |
| 2014/0199958 A1* | 7/2014 | Hassan | G01S 5/0027 455/404.2 |
| 2014/0295786 A1* | 10/2014 | Maier | H04W 4/22 455/404.2 |
| 2015/0029945 A1* | 1/2015 | Do | H04W 76/02 370/329 |
| 2015/0051993 A1* | 2/2015 | Moshfeghi | G01S 19/48 705/18 |
| 2015/0373491 A1* | 12/2015 | Lim | G01S 5/0257 455/456.1 |
| 2016/0044718 A1* | 2/2016 | Do | H04W 76/02 370/329 |
| 2016/0198337 A1* | 7/2016 | Cho | H04W 48/14 370/328 |
| 2016/0234709 A1* | 8/2016 | Fischer | H04W 4/02 |
| 2016/0374132 A1* | 12/2016 | Yerrabommanahalli | H04L 65/1006 |

OTHER PUBLICATIONS

International Search Report dated May 15, 2013 corresponding to International Patent Application No. PCT/EP2012/063281.
Jyh-Cheng Chen et al., "Wireless IP Network Architectures," in: "IP-Based Next-Generation Wireless Networks," Jan. 9, 2004, John Wiley & Sons, Inc., XP055057150, 74 pages.
3GPP TS 29.212 V11.5.0 (Jun. 2012), Technical Specification, 3rd Generation Partnership Project; Technical Specification Group Core Network and Terminals; Policy and Charging Control (PCC) over Gx/Sd reference point (Release 11), XP050580950, retrieved Jun. 27, 2012, pp. 1-194.
3GPP TR 23.852 V1.1.0 (May 2012), Technical Report, 3rd Generation Partnership Project; Technical Specification Group services and System Aspects; Study on S2a Mobility Based on GTP & WLAN access to EPC (SaMOG); Stage 2, (Release 12), XP050625467, retrieved Jun. 1, 2012, 41 pages.
European Office Action dated Apr. 19, 2017, issued in corresponding EP Application No. 12 733 483.7—1854.

\* cited by examiner

ADDING SERVICE SET IDENTIFIER OR ACCESS POINT NAME TO WLAN TO CELLULAR SIGNALLING MESSAGES

BACKGROUND OF THE INVENTION

Field of the Invention

The present invention relates to location information of a local area network in a cellular communications network system when the local area network provides wireless access to a core network of the cellular communications network system.

Related Background Art

The following meanings for the abbreviations used in this specification apply:
3GPP third generation partnership project
AAA authentication, authorization, accounting
AF application function
AVP attribute value pair
CC contents of communications
CDR charging data record
CG charging gateway
CGI cell global identifier
ECGI E-UTRAN CGI
E-UTRAN evolved universal terrestrial radio access network
ePDG evolved packet data gateway
GGSN gateway GPRS support node
GPRS general packet radio service
GTP GPRS tunneling protocol
GW gateway
IMS IP multimedia system
IP internet protocol
IRI intercept related information
LAI location area identifier
LIG lawful interception gateway
MAC medium access control
OCS online charging system
PCRF policy charging and rules function
P-CSCF proxy call session control function
PDN packet data network
PGW packet GW
PMIP proxy mobile IP
R release
RAI routing area identifier
SAI service area identifier
SSID service set identifier
TAI tracking area identity
UE user equipment
ULI user location information
v version
WLAN wireless local area network In a cellular communications network system, operators are interested in using WLAN(s) as complementary access and in offloading selected users from the cellular communications network system to WLAN(s). Commonly, it is desired to connect a WLAN access to an operator's core network of the cellular communications network system. This way, core functionalities (e.g. policy enforcement, charging, lawful interception, etc.) become available for WLAN access.

Currently there is an interest in a trusted WLAN access which is under standardisation in 3GPP R11. From the architecture point of view, there is an access GW between the trusted WLAN access and a PGW. The access GW is connected to the PGW via an interface S2a. GTP based S2a is currently under standardisation in 3GPP R11. In addition, there is a solution to use an interface Gn for connecting an access GW and a GGSN.

There is also an interest in an untrusted WLAN access. From the architecture point of view, there is an ePDG between the untrusted WLAN access and the PGW. The ePDG is connected to the PGW via an interface S2b. GTP based S2b is standardised in 3GPP R10.

It is to be noted that it is also possible to use PMIPv6 on the interfaces S2a, S2b. Location information is not available for GTP based S2a nor GTP based S2b, and neither for the Gn interface nor for PMIPv6 based S2a. Location information is needed in the PGW/GGSN for multiple purposes, e.g. for policy enforcement, charging and lawful interception.

SUMMARY OF THE INVENTION

The present invention aims at enabling use of location information of a local area network in a core network of a cellular communications network system, when the local area network is used for wirelessly accessing the core network.

This is achieved at least in part by the methods and apparatuses as defined in the appended claims. The invention may also be implemented by a computer program product.

In the following the invention will be described by way of exemplary embodiments thereof with reference to the accompanying drawings which—together with the description—form part of the specification of this application.

DESCRIPTION OF THE EMBODIMENTS

Figure 1:
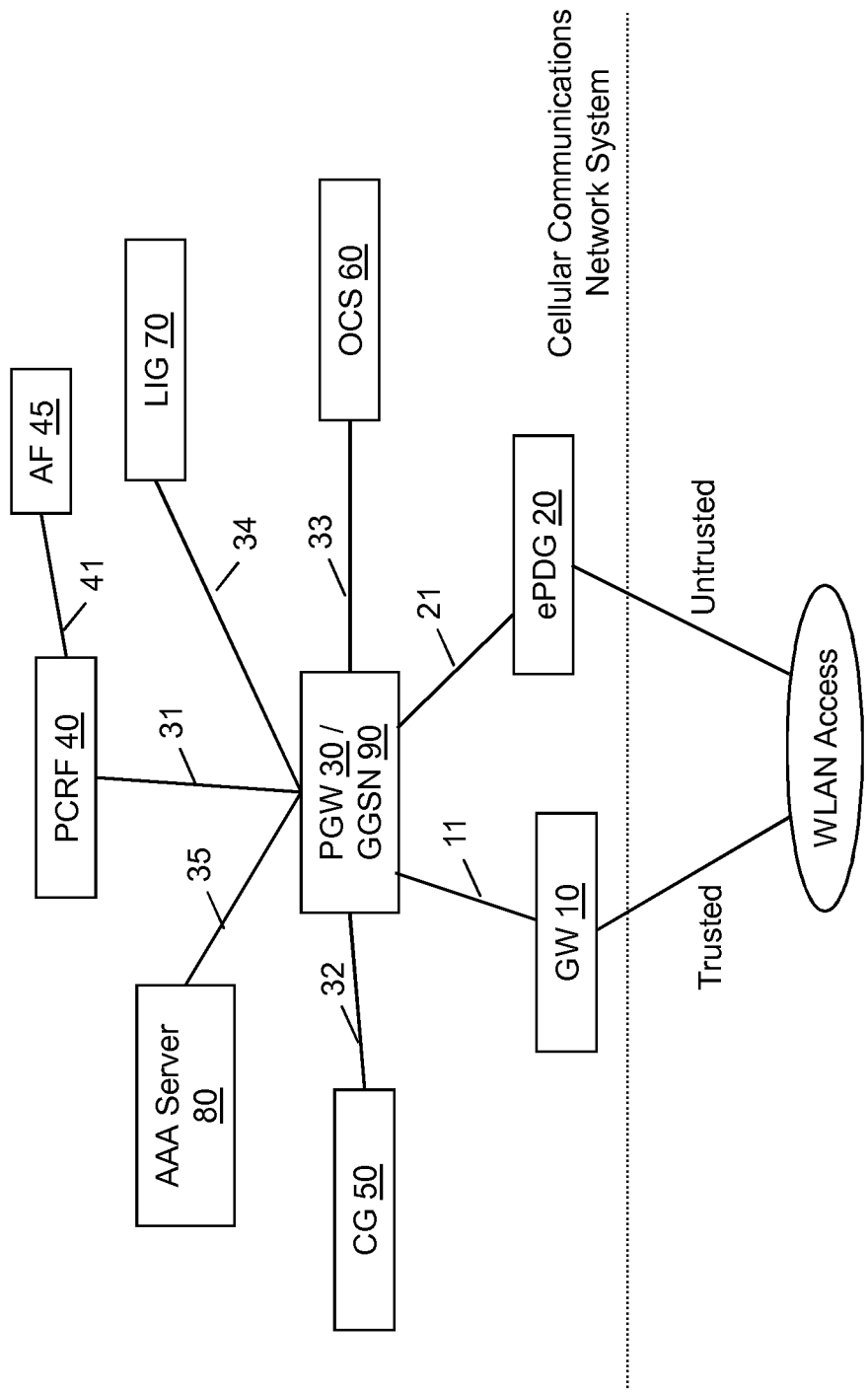
FIG. 1 shows a schematic block diagram illustrating an architecture of a cellular communications network system which is wirelessly accessed via a local area network, to which the invention may be applied according to an exemplary embodiment thereof.

FIG. 1 shows an architecture of a cellular communications network system to which the present invention may be applied according to an exemplary embodiment thereof.

As shown in FIG. 1, a GW (access gateway) 10 is present between a trusted WLAN access and a PGW 30 and/or a GGSN 90, and an ePDG 20 is present between an untrusted WLAN access and the PGW 30. The GW 10 and the PGW 30 or the GW 10 and the GGSN 90 are connected via a link 11, e.g. an interface S2a or an interface Gn. The ePDG 20 and the PGW 30 are connected via a link 21, e.g. an interface S2b.

The PGW 30 is connected to a PCRF 40 via a link 31, e.g. an interface Gx, to a charging gateway CG 50 via a link 32, e.g. an interface transmitting a CDR content, to an OCS 60 via a link 33, e.g. an interface Gy, to an LIG 70 via a link 34, e.g. an interface transmitting an IRI content and/or a CC content, and to an AAA server 80 via a link 35, e.g. an interface SGi or an interface S6b.

The PCRF 40 is connected to an AF 45 via a link 41, e.g. an interface Rx. The AF 45 may comprise a P-CSCF in IMS layer, for example.

It is to be noted that the PGW 30 may be connected to further entities and the entities PCRF 40, CG 50, OCS 60, LIG 70 and AAA server 80 do not form a complete enumeration. Similarly, the cellular communications network system may comprise further entities in addition to those shown in FIG. 1.

According to an embodiment of the invention, a message according to a protocol of the cellular communications network system may be generated, and location information of a local area network, which provides wireless access for a user equipment to a core network of the cellular communications network system, e.g. a WLAN, may be included in the message. The message may be communicated over an interface according to the protocol of the cellular communications network system. The message may be a signaling message, and the signaling may comprise at least one of GTPv1, GTPv2, PMIPv6, Gx, Gy, SGi, S6b, CDR IRI and CC, for example.

The location information may comprise at least one of SSID, WLAN access point name, WLAN access point identifier, WLAN access point MAC address, etc.

For example, the GW 10 generates a GTPv2 signaling message including location information of the WLAN providing trusted access, and transmits the GTPv2 signaling message to the PGW 30 via the interface S2a. Similarly, the ePDG 20 may generate a GTPv2 signaling message including location information of the WLAN providing untrusted access, and transmit the GTPv2 signaling message to the PGW 30 via the interface S2b.

The PGW 30 receives the GTPv2 signaling message including location information of the WLAN. The PGW 30 may forward the location information to the PCRF 40 via the interface Gx. That is, the PGW 30 may generate a Gx signaling message including the location information, and transmit the Gx signaling message to the PCRF 40. The PCRF 40 may forward the location information to the AF 45. That is, the PCRF 40 may generate an Rx signaling message including the location information, and transmit the Rx signaling message to the AF 45.

Similarly, the PGW 30 may include the location information into a CDR content, and transmit the CDR content to the CG 50.

Moreover, the PGW 30 may generate a Gy signaling message including the location information received from the GW 10 or the ePDG 20, and transmit the Gy signaling message to the OCS 60. Similarly, the PGW 30 may include the location information into an IRI content, and transmit the IRI content to the LIG 70.

Further, the PGW 30 may generate an SGi signaling message or an S6b signaling message including the location information received from the GW 10 or the ePDG 20, and transmit the SGi signaling message or the S6b signaling message to the AAA server 80.

The location information of the WLAN may be included in the signaling message or the respective content by introducing an information element to the signaling message/the content, which will be referred to in the following as WLAN location information. The WLAN location information may comprise fields for WLAN specific location information options and flags for each field to indicate whether or not the location information option is present.

Alternatively, fields for WLAN specific location information options may be added to existing information elements, e.g. ULI in case of GTPv2, and flags for each field may be added to the existing information elements to indicate whether or not the location information option is present in the existing information elements. In 3GPP, ULI has been standardized in GTPv2. Conventionally, ULI contains only cellular specific location information (such as CGI, SAI, RAI, TAI, ECGI, LAI). With the present enhancement of the ULI, backwards compatibility is ensured.

In CDR content, it is possible to add a new field for the location information of the WLAN or enhance the existing field (e.g. User Location Information). The same possibilities apply to IRI content.

In Radius/Diameter signalling, it is possible to introduce a new information element for the location information of the WLAN or enhance the existing information element (i.e. 3GPP-User-Location-Information).

The above-described location information options may comprise at least one of SSID, WLAN access point name, WLAN access point identifier, WLAN access point MAC address, etc.

The message containing the location information of the WLAN may be generated and transmitted by the GW 10/ePDG 20 to the PGW 30 in response to detecting a location change of the user equipment in the WLAN.

Alternatively or in addition, the message containing the location information of the WLAN may be generated and transmitted by the GW 10/ePDG 20 to the PGW 30 in response to receiving a request for a location report from the PGW 30.

Alternatively, the location information of the WLAN may be included into each signaling message (i.e. GTPv1/GTPv2 signaling) transmitted by the GW 10/ePDG 20 to the PGW 30.

Thus, location information of the WLAN can added to many GTPv1/GTPv2 signalling messages, e.g. create session request, delete session request and other relevant GTPv1/GTPv2 signalling messages.

The PCRF 40 and OCS 60 may generate an event trigger of requesting location information of the WLAN, and transmit a request for the location information to the PGW 30 based on the event trigger. For this purpose, an information element may be introduced for the event trigger. Alternatively, the event trigger of requesting the location information may be added to an event trigger information element.

Currently, on the interface Gx/Gy, there are event triggers which may be set by the PCRF 40/OCS 60 if the PCRF 40/OCS 60 wants to know about location information changes. For enabling the PCRF 40/OCS 60 to request information on a change of the location information of the WLAN (e.g. SSID change, WLAN access point name change, WLAN access point identifier, WLAN access point MAC address change, etc.), an event trigger information element may be added as described above, or an existing event trigger information element (e.g. Event-Trigger AVP) may be enhanced.

Figure 2:
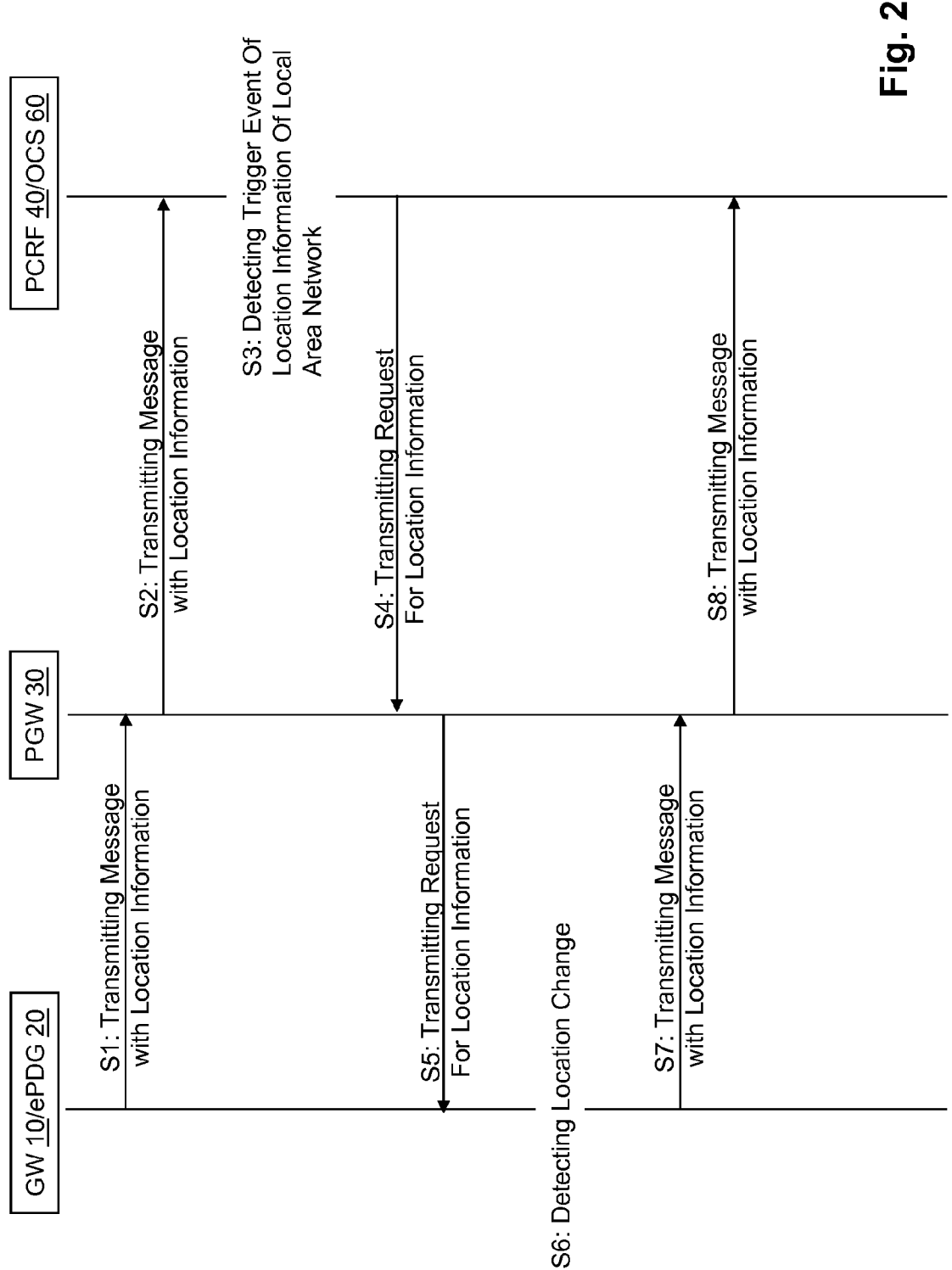
FIG. 2 shows a signaling diagram illustrating an example scenario of making available location information of a local area network in a core network of a cellular communications network system, according to an exemplary embodiment of the invention.

FIG. 2 shows a signaling diagram illustrating an example scenario of making available location information of a local area network (in the following referred to as WLAN), in a core network of a cellular communications network system, according to an exemplary embodiment of the invention.

In a process S1, a GW 10 or ePDG 20, which is located between a WLAN access and a PGW 30 as shown in FIG. 1, transmits a message to the PGW 30 including location information of the WLAN. For example, the location information may be sent in a signaling to create a PDN connection in the PGW 30. As described above, the signaling message may be a GTPv1, GTPv2 or PMIPv6 signaling message. The location information may comprise at least one of SSID, WLAN access point name, WLAN access point identifier, WLAN access point MAC address, etc.

In a process S2, the PGW 30 signals with a PCRF 40 and/or OCS 60 as shown in FIG. 1, and sends the location information received in process S1 to the PCRF 40/OCS 60. The signalling message may be a Gx/Gy signalling message.

In a process S3, the PCRF 40/OCS 60 detects a trigger event of location information of the WLAN and transmits a request for the location information in a process S4. For example, if the PCRF 40/OCS 60 wants to receive up-to-date location information when a user location changes, an event trigger is set in a response message to the PGW 30 to request up-to-date location information. The response message may be a Gx/Gy signalling message.

In a process S5 the PGW 30 informs the GW 10/ePDG 20 that it wants to receive up-to-date location information when responding to the GW 10/ePDG 20. This response message may be a GTPv1, GTPv2 or PMIPv6 signaling message.

In a process S6, the GW 10/ePDG 20 detects a location change of a user equipment in the WLAN. Thereupon, the GW 10/ePDG 20 generates a signaling message, includes location information of the WLAN into the signaling message, and transmits the signaling message to the PGW 30 (S7). As described above, the signaling message may be a GTPv1, GTPv2 or PMIPv6 signaling message. The location information may comprise at least one of SSID, WLAN access point name, WLAN access point identifier, WLAN access point MAC address, etc.

The PGW 30 receives the location information from the GW 10/ePDG 20, generates a signalling message, includes the location information received from the GW 10/ePDG 20 into the signalling message, and transmits the signalling message to the PCRF 40/OCS 60 (S8). The signalling message may be a Gx/Gy signalling message.

It is to be noted that FIG. 2 depicts a specific scenario of when the messages including the location information of the WLAN are transmitted. The message including the location information transmitted in S7 may also be transmitted whenever the location of the user equipment changes or in any signalling sent by the GW 10/ePDG 20 as described above.

Moreover, the PGW 30 may forward the location information as shown in process S8 independently from the request for the location information from the PCRF 40/OCS 60.

Figure 3:
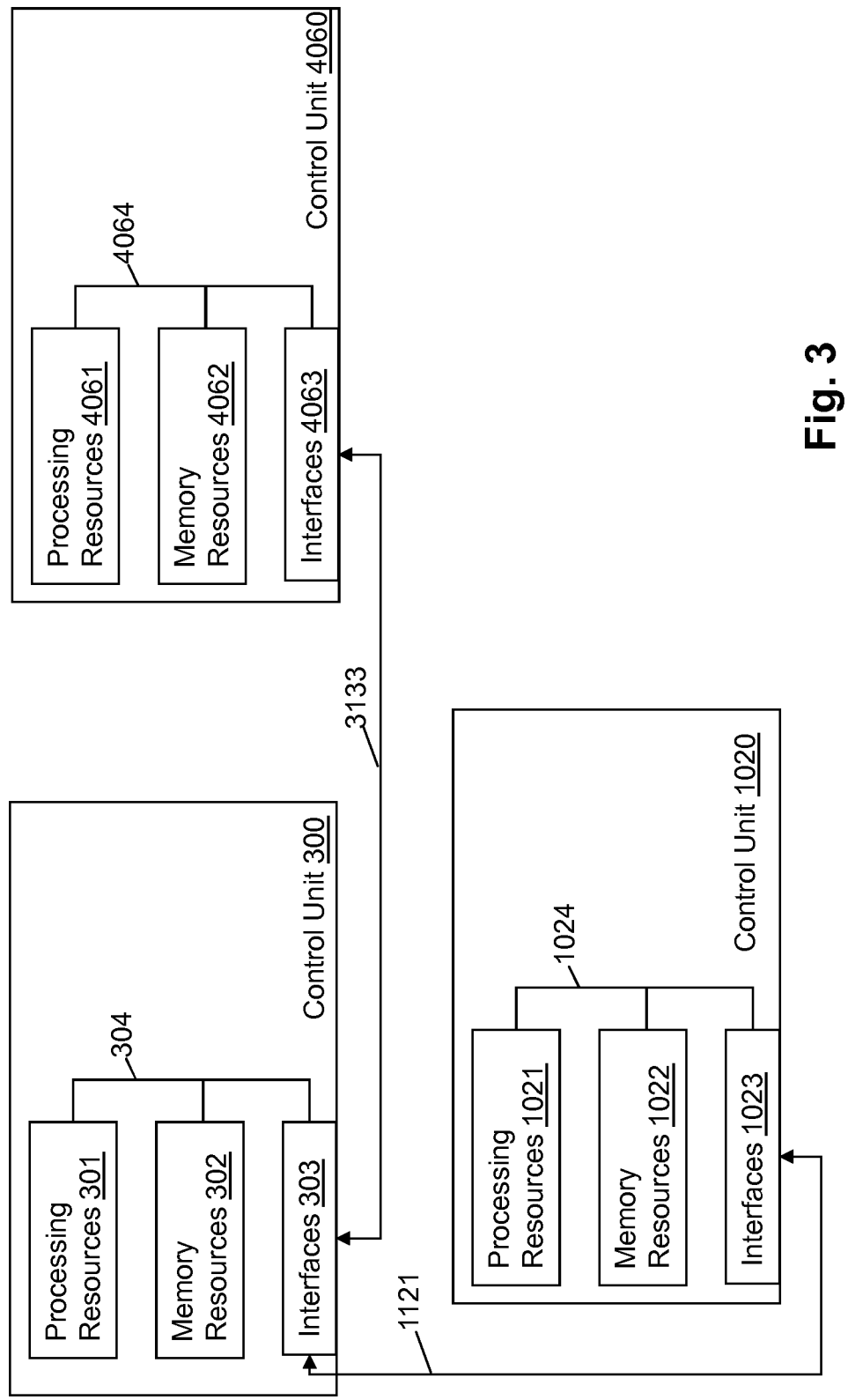
FIG. 3 shows a simplified block diagram of various electronic devices that are suitable for use in practicing the exemplary embodiments of this invention.

Now reference is made to FIG. 3 for illustrating a simplified block diagram of various electronic devices that are suitable for use in practicing the exemplary embodiments of this invention.

A control unit 1020, which may be part of or used by the access gateway GW 10 or the ePDG 20 between the WLAN access and the PGW 30 shown in FIGS. 1 and 2, comprises processing resources 1021, memory resources 1022 and interfaces 1023 which are connected by a link 1024. The operations of the GW 10 and the operations of the ePDG 20 as described above may be carried out by the control unit 1020 using its processing resources 1021, memory resources 1022 and interfaces 1023.

A control unit 300, which may be part of or used by the PGW 30 shown in FIGS. 1 and 2 or the GGSN 90 shown in FIG. 1, comprises processing resources 301, memory resources 302 and interfaces 303 which are connected by a link 304. The operations of the PGW 30 as described above may be carried out by the control unit 300 using its processing resources 301, memory resources 302 and interfaces 303.

A control unit 4060, which may be part of or used by the PCRF 40 or the OCS 60 shown in FIGS. 1 and 2, or the CG 50, LIG 70 and AAA server 80 shown in FIG. 1, comprises processing resources 4061, memory resources 4062 and interfaces 4063 which are connected by a link 4064. The operations of the PCRF 40 or the operations of the OCS 60 as described above may be carried out by the control unit 4060 using its processing resources 4061, memory resources 4062 and interfaces 4063.

The control unit 1020 is connected to the control unit 300 through the interfaces 1023 via a link 1121, and the control unit 300 is connected to the control unit 4060 through the interface 4063 via a link 3133. The link 1121 may comprise an S2a interface, an S2b interface and a Gn interface, and the link 3133 may comprise a Gx interface, Gy interface, SGi interface, S6b interface, an interface for transmitting an OCS, an interface for transmitting a CC content and an interface for transmitting an IRI content.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

The memory resources 1022, 302, 4062 each may store a program.

At least one of the programs stored in the memory resources 1022, 302, 4062 is assumed to include program instructions that, when executed by the associated processing resources, enable the electronic device to operate in accordance with the exemplary embodiments of this invention, as detailed above.

In general, the exemplary embodiments of this invention may be implemented by computer software stored in the memory resources 1022, 302, 4062 and executable by the respective processing resources 1021, 301, 4061, or by hardware, or by a combination of software and/or firmware and hardware in any or all of the devices shown.

The memory resources 1022, 302, 4062 may be of any type suitable to the local technical environment and may be implemented using any suitable data storage technology, such as semiconductor-based memory devices, magnetic memory devices and systems, optical memory devices and systems, fixed memory and removable memory. The processing resources 1021, 301, 4061 may be of any type suitable to the local technical environment, and may include one or more of general purpose computers, special purpose computers, microprocessors, digital signal processors (DSPs) and processors based on a multi-core processor architecture, as non-limiting examples.

According to an aspect of the invention, an apparatus comprises means for generating a message according to a protocol of a cellular communications network system, means for including location information of a local area network, which provides wireless access for a user equipment to a core network of the cellular communications network system, in the message, and means for communicating the message over an interface according to the protocol of the cellular communications network system.

The apparatus may further comprise means for receiving the location information of the local area network.

The means for including the location information of the local area network in the message may comprise means for introducing an information element to the message, the information element comprising fields for location information options of the local area network and flags for each field to indicate whether or not the location information option is present.

Alternatively, the means for including the location information of the local area network in the message may comprise means for adding fields for location information options of the local area network to user location information in the message, and flags for each field to the user location information to indicate whether or not the location information option is present in the user location information.

The apparatus may comprise any one of the control units 1020, 300 and 4060, and the above means may be implemented by the respective processing resources, memory resources and interfaces of the control units.

The apparatus may further comprise means for detecting a location change of the user equipment in the wireless access via the local area network, and means for, in response to the location change, generating the message containing the location information of the local area network and transmitting the message. The apparatus may comprise the control unit 1020, and the above means may be implemented by the processing resources 1021, memory resources 1022 and interfaces 1023 of the control unit 1020.

The apparatus may further comprise means for receiving a request for a location report, and means for, in response to the request, generating the message containing the location information of the local area network and transmitting the message. The apparatus may comprise the control unit 1020 and 300, and the above means may be implemented by the respective processing resources, memory resources and interfaces of the control units 1020 and 300.

The message may be a signaling message, and the apparatus may further comprise means for including the location information of the local area network into each signaling message to be transmitted. The apparatus may comprise any one of the control units 1020, 300 and 4060, and the above means may be implemented by the respective processing resources, memory resources and interfaces of the control units.

The apparatus may further comprise means for generating an event trigger of requesting location information of the local area network, and means for transmitting a request for the location information over an interface of the cellular communications network system, based on the event trigger. The apparatus may further comprise means for introducing an information element for the event trigger of requesting the location information. Alternatively, the apparatus may further comprise means for adding the event trigger of requesting the location information to an event trigger information element. The apparatus may comprise the control unit 4060, and the above means may be implemented by the processing resources 4061, memory resources 4062 and interfaces 4063 of the control unit 4060.

According to an aspect of the invention, an apparatus comprises means for generating an event trigger of requesting location information of a local area network which provides wireless access for a user equipment to a core network of a cellular communications network system, and means for transmitting a request for the location information over an interface of the cellular communications network system, based on the event trigger.

The apparatus may further comprise means for introducing an information element for the event trigger of requesting the location information.

Alternatively, the apparatus may further comprise means for adding the event trigger of requesting the location information to an event trigger information element.

The apparatus may comprise the control unit 4060, and the above means may be implemented by the processing resources 4061, memory resources 4062 and interfaces 4063 of the control unit 4060.

The above described location information and location information options may comprise at least one of the following group: service set identifier, access point name of the local area network, access point identifier of the local area network, and an access point medium access control address of the local area network.

The above described protocol of the cellular communications network system may comprise a general packet radio service tunneling protocol and/or proxy mobile internet protocol.

The above described interface may comprises at least one of the following group: an S2a interface, an S2b interface, a Gn interface, a Gx interface, a Gy interface, an Rx interface, an interface transmitting a CDR content, an interface transmitting an IRI content, an interface transmitting a CC content, an SGi interface and an S6b interface.

It is to be understood that the above description is illustrative of the invention and is not to be construed as limiting the invention. Various modifications and applications may occur to those skilled in the art without departing from the true spirit and scope of the invention as defined by the appended claims.

The invention claimed is:

1. A method comprising:
    generating an event trigger of requesting location information of a local area network;
    transmitting a request for the location information over an interface of a cellular communications network system, based on the event trigger;
    in response to receipt of the request, generating a message according to a protocol of the cellular communications network system;
        including location information of the local area network, which provides wireless access for a user equipment to a core network of the cellular communications network system, in the message;
    communicating the message over an interface according to the protocol of the cellular communications network system;
    detecting a location change of the user equipment in the wireless access via the local area network; and
    in response to the location change, generating the message containing the location information of the local area network and transmitting the message,
    wherein the location information comprises location information of an access point corresponding to the local area network, and
    wherein the location information further comprises fields for local area network specific location information options, and flags for each field to indicate whether or not the location information option is present in the message.

2. The method of claim 1, comprising:
receiving the location information of the local area network.

3. The method of claim 1, the including of the location information of the local area network comprising:
adding fields for location information options of the local area network to user location information in the message, and flags for each field to the user location information to indicate whether or not the location information option is present in the user location information.

4. The method of claim 1, comprising:
receiving a request for a location report; and
in response to the request, generating the message containing the location information of the local area network and transmitting the message.

5. The method of claim 1, wherein the message is a signaling message, the method comprising:
including the location information of the local area network into each signaling message to be transmitted.

6. The method of claim 1, wherein the location information and location information options comprise at least one of the following group: service set identifier, access point name of the local area network, access point identifier of the local area network, and an access point medium access control address of the local area network.

7. The method of claim 1, wherein the protocol of the cellular communications network system comprises a general packet radio service tunneling protocol and/or proxy mobile internet protocol.

8. The method of claim 1, wherein the interface comprises at least one of the following group: an S2a interface, an S2b interface, a Gn interface, a Gx interface, a Gy interface, an Rx interface, an interface transmitting a CDR content, an interface transmitting an IRI content, an interface transmitting a CC content, an SGi interface and an S6b interface.

9. A computer program for a processing device, embodied on a non-transitory computer readable medium, comprising software code portions for performing the steps of claim 1 when the program is run on the processing device.

10. The computer program product according to claim 9, wherein the program is directly loadable into an internal memory of the processing device.

11. An apparatus configured to:
generate an event trigger of requesting location information of a local area network:
transmit a request for the location information over an interface of a cellular communications network system, based on the event trigger;
in response to receipt of the request, generate a message according to a protocol of the cellular communications network system;
include location information of the local area network, which provides wireless access for a user equipment to a core network of the cellular communications network system, in the message;
communicate the message over an interface according to the protocol of the cellular communications network system;
detect a location change of the user equipment in the wireless access via the local area network; and
in response to the detection of the location change, generate the message containing the location information of the local area network and transmit the message,
wherein the location information comprises location information of an access point corresponding to the local area network, and
wherein the location information further comprises fields for local area network specific location information options, and flags for each field to indicate whether or not the location information option is present in the message.

12. The apparatus of claim 11, configured to:
receive the location information of the local area network.

13. The apparatus of claim 11, wherein the apparatus, to include the location information of the local area network in the message, is configured to:
add fields for location information options of the local area network to user location information in the message, and flags for each field to the user location information to indicate whether or not the location information option is present in the user location information.

14. The apparatus of claim 11, configured to:
receive a request for a location report; and
in response to the receipt of the request, generate the message containing the location information of the local area network and transmit the message.

15. The apparatus of claim 11, wherein the message is a signaling message, the apparatus configured to:
include the location information of the local area network into each signaling message to be transmitted.

16. A method comprising:
generating an event trigger of requesting location information of an access point corresponding to a local area network which provides wireless access for a user equipment to a core network of a cellular communications network system;
detecting a location change of a user equipment (UE) based on the event trigger;
transmitting a request for the location information over an interface of the cellular communications network system, based on the event trigger,
wherein the location information comprises fields for local area network specific location information options, and flags for each field to indicate whether or not the location information option is present in a message indicating the location information.

17. The method of claim 1, comprising:
introducing an information element for the event trigger of requesting the location information.

18. The method of claim 1, comprising:
adding the event trigger of requesting the location information to an event trigger information element.

19. An apparatus, configured to:
generate an event trigger of requesting location information of an access point corresponding to a local area network which provides wireless access for a user equipment to a core network of a cellular communications network system;
detect a location change of a user equipment (UE) based on the event trigger;
transmit a request for the location information over an interface of the cellular communications network system, based on the event trigger,
wherein the location information comprises fields for local area network specific location information options, and flags for each field to indicate whether or not the location information option is present in a message indicating the location information.

20. The apparatus of claim 11, configured to:
introduce an information element for the event trigger of requesting the location information.

21. The apparatus of claim 11, configured to:
add the event trigger of requesting the location information to an event trigger information element.

* * * * *